(12) United States Patent
Lauer et al.

(10) Patent No.: US 6,182,689 B1
(45) Date of Patent: Feb. 6, 2001

(54) FILTER MECHANISM FOR DIAPHRAGM FLUSH VALVE

(75) Inventors: John W. Lauer, Streamwood; David C. Hall, Wheaton, both of IL (US)

(73) Assignee: Sloan Valve Company, Franklin Park, IL (US)

( * ) Notice: Under 35 U.S.C. 154(b), the term of this patent shall be extended for 0 days.

(21) Appl. No.: 09/353,203

(22) Filed: Jul. 14, 1999

(51) Int. Cl.[7] ............................. F16K 31/385; E03B 7/07
(52) U.S. Cl. ............................................. 137/550; 251/40
(58) Field of Search ............................. 137/550; 251/40

(56) References Cited

U.S. PATENT DOCUMENTS

| | | |
|---|---|---|
| 1,714,573 | 5/1929 | Sloan . |
| 2,046,004 | 6/1936 | Sloan . |
| 2,776,812 | 1/1957 | Colendar . |
| 2,916,251 | 12/1959 | Butts . |
| 3,279,742 | * 10/1966 | Billeter ................................. 251/40 |
| 3,911,796 | 10/1975 | Hull et al. . |
| 4,261,545 | 4/1981 | Allen . |
| 4,327,891 | 5/1982 | Allen et al. . |
| 5,213,305 | 5/1993 | Whiteside et al. . |
| 5,332,192 | 7/1994 | Whiteside . |
| 5,887,848 | * 3/1999 | Wilson ................................. 251/40 |
| 5,967,182 | * 10/1999 | Wilson ................................. 137/544 |

* cited by examiner

*Primary Examiner*—John Rivell
(74) *Attorney, Agent, or Firm*—McEachran, Jambor, Keating, Bock & Kurtz

(57) ABSTRACT

A diaphragm assembly for use in a diaphragm type toilet room flush valve includes a diaphragm formed of a flexible material and adapted to separate an inlet and outlet of the flush valve. There is a bypass orifice in the diaphragm. A filter assembly is positioned on the flush valve inlet side of the diaphragm and upstream from the bypass orifice. The filter assembly includes a peripherally extending screen spaced from the underside of the diaphragm with the screen being secured to the diaphragm assembly about an inner peripheral portion thereof.

11 Claims, 2 Drawing Sheets

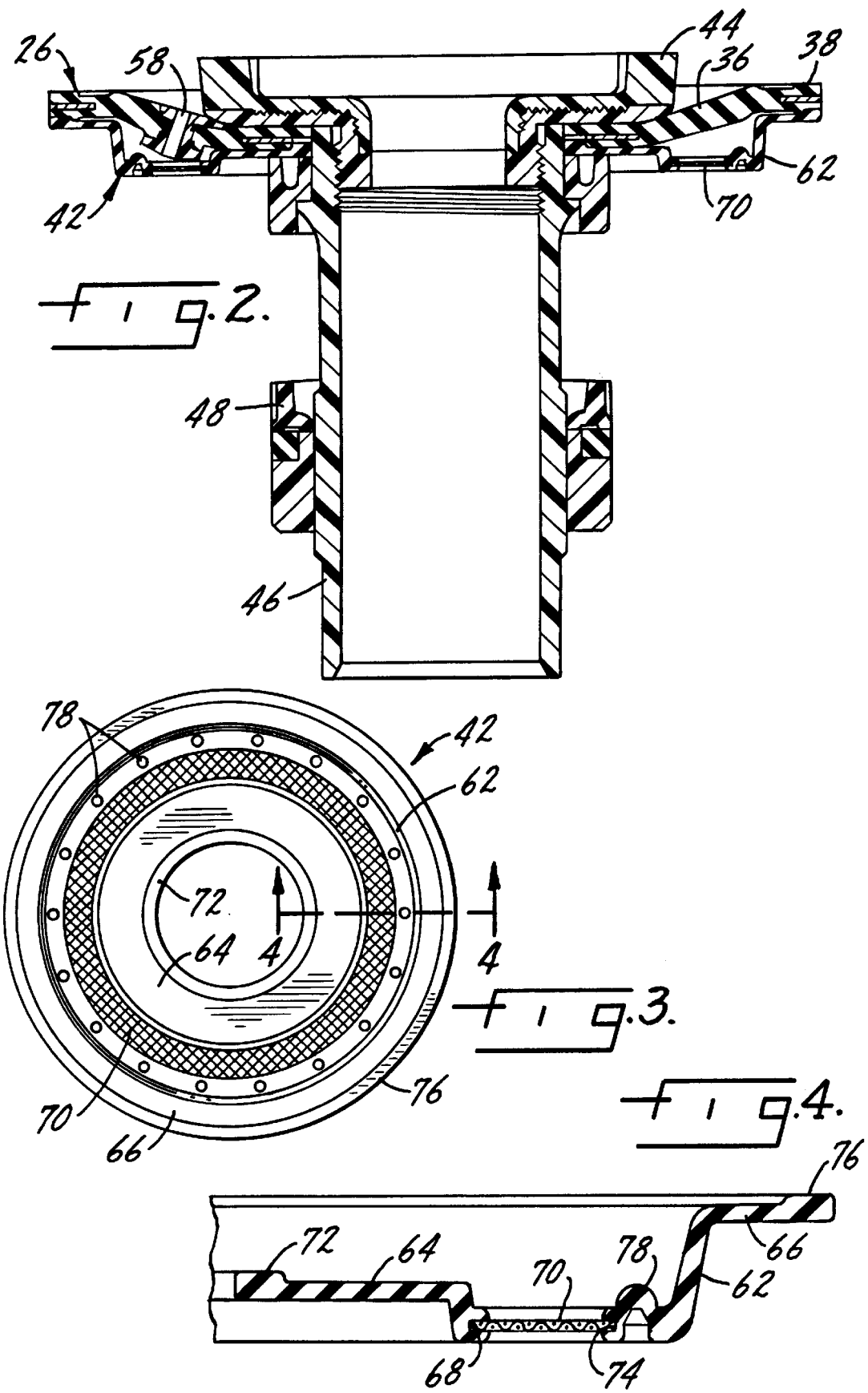

FILTER MECHANISM FOR DIAPHRAGM FLUSH VALVE

FIELD OF THE INVENTION

The present invention relates to toilet room flush valves and more particularly to such flush valves in which a flexible diaphragm functions to separate the flush valve inlet and outlet. Conventionally, such diaphragm type flush valves have a pressure chamber located above the diaphragm to maintain the diaphragm on its seat to provide valve closure. There is a bypass orifice in the diaphragm which connects the flush valve inlet to the pressure chamber to provide the water necessary to move the diaphragm to the valve closing position. Frequently, the water system supplying flush valves for use in toilet rooms may contain particles which will clog the bypass orifice with the result that the valve becomes non-functional. The present invention provides a peripheral screen located at the upstream side of the valve orifice to filter particles from passing to the orifice and thereby preventing the valve from malfunctioning. Preferably the mesh size of the screen is such that no particle can pass through the screen unless it is smaller in diameter than the diameter of the bypass orifice.

SUMMARY OF THE INVENTION

The present invention relates to diaphragm type toilet room flush valves and more particularly to an improved filter for protecting the bypass orifice in such a valve.

A primary purpose of the invention is to provide a simply constructed, reliable, filter located at the upstream side of the bypass orifice for a diaphragm type flush valve.

Another purpose is to provide a filter of the type described which includes a peripherally extending screen, mounted in a screen carrier with the carrier being captured at its inner peripheral edge to the diaphragm assembly and at its outer peripheral edge to the flush valve body.

Another purpose is a flush valve with diaphragm assembly including a filter screen as described in which the size of the screen openings is smaller than the opening in the bypass orifice.

Other purposes will appear in the ensuing specification, drawings and claims.

DESCRIPTION OF THE DRAWINGS

The invention is illustrated diagrammatically in the following drawings wherein:

FIG. 2. is an axial section of the diaphragm assembly;

FIG. 3 is a top view of the filter assembly: and

FIG. 4 is a section along plane 4—4 of FIG. 3.

DESCRIPTION OF THE PREFERRED EMBODIMENT

Figure 1:
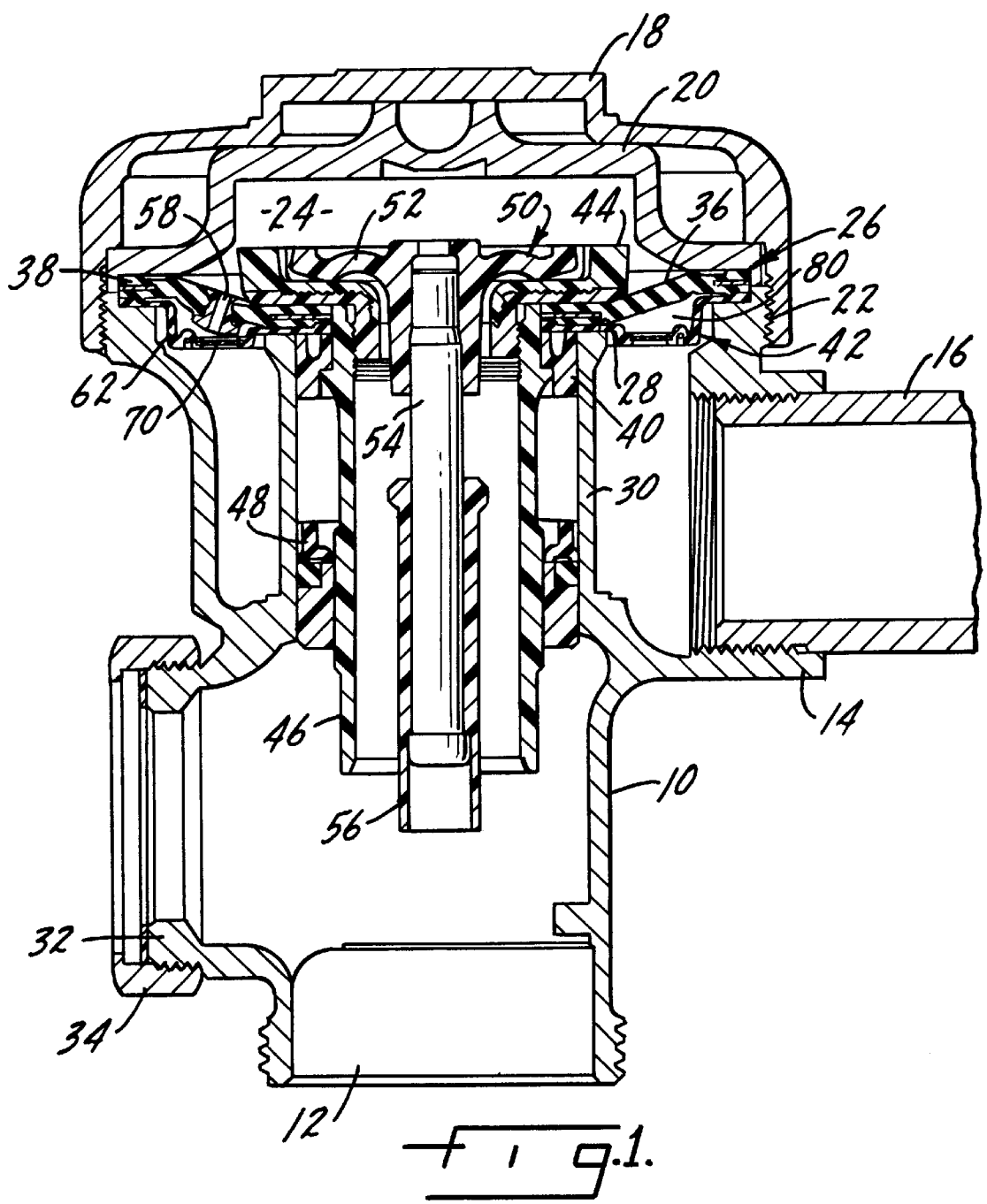
FIG. 1 is an axial section thru a flush valve of the present invention.

A flush valve of the type used in toilet rooms for both water closets and urinals is shown in the drawings, and more specifically the flush valve shown is of the type sold by the assignee of the present application, Sloan Valve Company of Franklin Park, Ill., under the trademark Regal. The filter which will be described in detail herein also has application in other types of flush valves, for example, a diaphragm type flush valve sold by Sloan Valve Company under the trademark Royal, as well as in other diaphragm type flush valves.

By the nature of their design, diaphragm type flush valves have not lent themselves well for the inclusion of a filtering element prior to the metering bypass hole. A good filter design in a diaphragm valve should provide a large filtering area that only filters the water that goes through the bypass. Previous inline filters in diaphragm valves filtered all the water going through the valve. As these filters trapped debris in the water, they would begin to restrict the flow through the valve, which would degrade the flushing performance. Filter designs that were only centered around the bypass orifice were small. The small filtering area in these designs meant that these filters could clog within a short period of time.

The large peripheral screen that is described herein extends 360° around the diaphragm. This provides a very large filtering area. As very little water actually flows through the metering bypass during the flush, this large filter area means that the valve will function for a very long time without the possibility of completely fouling the filter.

The peripheral design of the filter also allows it be captured by the diaphragm and valve cover. When the cover is put on the valve, it not only holds the diaphragm in place, but it also holds the filter in place. The peripheral design of the filter allows it to seal both at the outer and inner edges, preventing any unfiltered water from getting to the bypass or leaking out of the valve. The filtering surface itself extends 360° around the diaphragm, so water can get from the internal valve chamber to the bypass from any position from within the valve. The peripheral surface of the filter ensures that there will always be a portion of the filter in the direct flow stream of the valve. The turbulence of this flow stream during the flush will help keep the screen surface free of particles and debris.

The flush valve includes a body 10 having an outlet 12 and an inlet 14. A conduit 16 is attached at the inlet 14 and may be coupled to a control valve, as is conventional in flush valve installations. At the upper end of the body 10 is a valve cover 18 which overlies an inner cover 20, with the cover 18 and the inner cover being attached to the body 10 at a threaded connection 22. The inner cover 20 defines the upper side of a pressure chamber 24 which is directly above a diaphragm assembly indicated generally at 26. Water will flow from the inlet 14 through a bypass orifice to be described into the pressure chamber which will maintain the diaphragm assembly 26 in a closed position on a valve seat 28 which is at the upper end of a barrel 30 formed as a part of the casting which forms the body 10.

The body 10 may have a boss 32 shown mounting a nut 34 and there may be either a manual handle attached at this point to operate the flush valve or there may be a sensor operated solenoid attached to cause operation of the flush valve.

The diaphragm assembly 26 includes a diaphragm 36 which is flexible and formed of a suitable elastomeric material. The outer periphery 38 of the diaphragm 36 is held in position by the inner cover 20 when the diaphragm is mounted between the inner cover and filter assembly 42. The diaphragm assembly further includes a refill head 40, details of which may be found in U.S. Pat. No. 5,649,686, assigned to Sloan Valve Company and the disclosure of which is incorporated by reference. The refill head is positioned directly beneath the filter assembly 42 which will be described in detail herein after. A ring 44 attaches the filter assembly to the diaphragm assembly 26 by threading into guide 46 and compressing the diaphragm and filter assembly. The diaphragm assembly includes, in addition to the components described above, the tubular guide 46 which is threaded to the ring 44, and a flow ring 48, the details of which are shown in U.S. Pat. No. 5,295,655, also assigned to Sloan Valve Company and the disclosure of which is incorporated by reference.

Located within the guide 46 is an auxiliary valve assembly 50, which includes a relief valve head 52 attached to a relief valve stem 54. Slidably movable on the stem 54 is a sleeve 56 which will be contacted by a reciprocally movable piston attached to the valve operator mounted in the opening 32. Details of the relief valve, the stem and the movable sleeve are shown in U.S. Pat. No. 5,755,253, also owned by Sloan Valve Company and the disclosure of which is incorporated by reference.

The diaphragm 36 includes a bypass orifice 58 which is in communication with the inlet 14 through the filter assembly 42. This is required as water must flow through this pathway to reach the pressure chamber 24 in order to effect closure of the diaphragm upon the seat 28. In normal valve operation, once the diaphragm is seated and the pressure chamber is filled with water to maintain the diaphragm in a closed position, the valve is operated by tipping of the auxiliary valve assembly, which moves the relief valve off of its seat within the ring 44 permitting water from within the chamber 24 to vent to the valve outlet 12. Water from the inlet 14 will then cause the diaphragm to raise up from its seat causing water to flow directly from the inlet 14 to the outlet 12. As soon as this action starts, the pressure chamber begins its refill cycle through the bypass orifice 58. Thus, to maintain a properly functioning valve, the bypass orifice must always be clear and open. Typically a bypass orifice will have a diameter of from 0.010 to 0.025 inch. However, water normally flowing in a public water system will have sediment or particles which may be of a size/geometry to clog such a very small opening. The filter assembly 42 is to stop particles from reaching the bypass orifice which would prevent its normal function.

The filter assembly 42 includes a ringlike screen element 70 which is located within a screen carrier 62. The screen mesh is of a size such that no particle can pass which is not smaller than the diameter of the bypass orifice. Thus, any particle which moves through the screen will also pass through the bypass orifice.

The screen carrier 62 is in two parts, an inner portion 64 and an outer portion 66. The inner portion, ringlike in configuration, has a peripheral groove 68 to mount the inner edge of the screen 70. The inner portion 64 also has an inner peripheral bead 72 which, when the screen is mounted in the diaphragm assembly, is clamped between the underside of the diaphragm and the top of the flow control ring 40. This mounts the inner periphery of the filter assembly.

The outer filter carrier 66 has a recess 74 which mounts the outer edge of the screen 70 and it has an outer peripheral bead 76 which is clamped on top of the body 10 and beneath the outer edge of the diaphragm when the cover 18 and the inner cover 20 are mounted to the valve body 10. Preferably the outer carrier 66 has a peripheral or circumferential raised area or bead 78 which strengthens the filter assembly and allows it to maintain its shape as water under substantial pressure flows in the area directly beneath the filter. Between the filter assembly and the underside of the diaphragm is a chamber 80 which receives water which is passed through the screen 70, with the sediment removed, with the bypass orifice 58 being in communication with the chamber 80. Thus, water flows from the inlet 14, into the area beneath the filter assembly, through the filter screen 70, into the chamber 80, then through the bypass orifice 58 and finally into the pressure chamber 24 where it performs its normal function.

Of importance in the invention is the use of a large peripheral strengthened filter in a form of a peripheral screen which removes any sediment which might otherwise clog the bypass orifice. Most present day diaphragm type flush valves do not have a screen for preventing debris flow into the bypass. The present invention provides a simple, reliably operable device for performing this function.

Whereas the preferred form of the invention has been shown and described herein, it should be realized that there may be many modifications, substitutions and alterations thereto.

We claim:

1. A diaphragm assembly for use in a diaphragm type toilet room flush valve including a diaphragm formed of a flexible material and adapted to separate an inlet and outlet of a flush valve, a bypass orifice in said diaphragm, a filter assembly positioned on the flush valve inlet side of said diaphragm and upstream from said bypass orifice, said filter assembly including a peripherally extending screen spaced from an underside of said diaphragm, said screen being secured in said diaphragm assembly about an inner peripheral portion of said screen.

2. The diaphragm assembly of claim 1 wherein said filter assembly extends circumferentially about the underside of said diaphragm and forms a water chamber therewith, said bypass orifice communicating with said water chamber.

3. The diaphragm assembly of claim 1 wherein said filter assembly has an outer peripheral portion generally coextensive with said diaphragm.

4. The diaphragm assembly of claim 1 wherein said filter assembly includes a screen element and a supporting carrier, said screen element extending circumferentially about the underside of the diaphragm.

5. The diaphragm assembly of claim 4 wherein said supporting carrier extends peripherally about the exterior of the said screen element and peripherally about the interior of the said screen element.

6. The diaphragm assembly of claim 5 wherein the peripheral interior of said supporting carrier is mounted to said diaphragm assembly.

7. The diaphragm assembly of claim 6 wherein the peripheral exterior of said supporting carrier is positioned directly adjacent said diaphragm when said diaphragm assembly is installed in a toilet room flush valve.

8. The diaphragm assembly of claim 1 wherein the openings in said screen are smaller than the bypass orifice.

9. A flush valve including a body having an inlet and an outlet, a passage connecting the inlet and outlet, a valve seat in said passage, a diaphragm positioned to control the flow of water through said passage and to close upon said seat, a bypass orifice mounted in said diaphragm, a filter assembly positioned on the inlet side of said diaphragm and upstream from said bypass orifice, said filter assembly including a peripherally extending screen spaced from an underside of said diaphragm, said filter assembly being secured to said diaphragm about an inner peripheral portion thereof and being secured to said flush valve body about an outer peripheral portion thereof.

10. The flush valve of claim 9 wherein said screen extends circumferentially about the underside of said diaphragm and forms a water chamber therewith, said bypass orifice being in communication with said water chamber.

11. The flush valve of claim 10 wherein said filter assembly includes a screen element and a supporting carrier, said supporting carrier being peripherally in contact with, at an inner portion thereof, to said diaphragm, with said supporting carrier being in contact with, at an outer peripheral portion thereof, to said flush valve body.

* * * * *